(12) United States Patent
Suzuki

(10) Patent No.: US 6,445,396 B1
(45) Date of Patent: Sep. 3, 2002

(54) COMMUNICATION APPARATUS CAPABLE OF CONTROLLING THE DISPLAY FORMAT OF A FIXED SENTENCE

(75) Inventor: Yasuko Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/249,323

(22) Filed: Feb. 12, 1999

(30) Foreign Application Priority Data

Feb. 23, 1998 (JP) .......................................... 10-040298

(51) Int. Cl.⁷ ............................. G09G 5/00; G06T 11/00
(52) U.S. Cl. ........................ 345/636; 345/468; 455/38.4
(58) Field of Search ............................... 455/38.4, 130, 455/566; 345/116, 636, 468, 472

(56) References Cited

U.S. PATENT DOCUMENTS

| | | | |
|---|---|---|---|
| 5,805,981 A | * 9/1998 | Sugio et al. | 455/38.4 |
| 5,828,313 A | * 10/1998 | Mochizuki | 340/825.44 |
| 5,870,682 A | * 2/1999 | Miwa et al. | 455/566 |
| 5,936,545 A | * 8/1999 | Tsumura | 340/825.44 |
| 6,028,530 A | * 2/2000 | Kondo | 340/825.44 |
| 6,044,248 A | * 3/2000 | Mochizuki et al. | 455/38.4 |
| 6,044,250 A | * 3/2000 | Kuramatsu et al. | 455/130 |

FOREIGN PATENT DOCUMENTS

| | | |
|---|---|---|
| JP | 7-336744 | 12/1995 |
| JP | 8-33011 | 2/1996 |
| JP | 8-182049 | 7/1996 |
| JP | 8-205218 | 8/1996 |
| JP | 8-214354 | 8/1996 |
| JP | 8-317441 | 11/1996 |
| JP | 8-336175 | 12/1996 |
| JP | 9-37320 | 2/1997 |
| JP | 9-191261 | 7/1997 |
| JP | 9-233514 | 9/1997 |
| JP | 9-233515 | 9/1997 |
| JP | 9-322214 | 12/1997 |

\* cited by examiner

*Primary Examiner*—Jeffery Brier
*Assistant Examiner*—Ryan Yang
(74) *Attorney, Agent, or Firm*—McGinn & Gibb, PLLC

(57) ABSTRACT

In a communication apparatus, a CPU (Central Processing Unit) 4 determines whether or not a message codeword included in a received message begins with a background picture display command. If a background picture display commands heads the message codeword, the CPU 4 reads a background picture designated by a symbol following the command out of a ROM (Read Only Memory) 7. If the message codeword includes a fixed sentence command, then the CPU 4 reads a fixed sentence designated by a symbol following the command out of a ROM 8. Each fixed sentence is associated a particular background picture stored in the ROM 7 and is displayed in a particular format in the background picture. As a result, each fixed sentence read out of the ROM 8 is displayed in a particular area on the basis of a background picture read out of the ROM 7. Further, when the message codeword includes a position command or a font command, the CPU 4 controls the position or the font of characters to be displayed in accordance with the command.

3 Claims, 14 Drawing Sheets

FIG.2

| NO. | TITLE | BACKGROUND PICTURE |
|---|---|---|
| 01 | HOW ARE YOU? | |
| 02 | GOOD NIGHT | |
| 03 | GOOD MORNING | |
| 04 | HAPPY | |

FIG.5

| ア(A) 11 | イ(I) 12 | ウ(U) 13 | エ(E) 14 | オ(O) 15 | A 16 | B 17 | C 18 | D 19 | E 10 |
|---|---|---|---|---|---|---|---|---|---|
| カ(KA) 21 | キ(KI) 22 | ク(KU) 23 | ケ(KE) 24 | コ(KO) 25 | F 26 | G 27 | H 28 | I 29 | J 20 |
| サ(SA) 31 | シ(SI) 32 | ス(SU) 33 | セ(SE) 34 | ソ(SO) 35 | K 36 | L 37 | M 38 | N 39 | O 30 |
| タ(TA) 41 | チ(TI) 42 | ツ(TU) 43 | テ(TE) 44 | ト(TO) 45 | P 46 | Q 47 | R 48 | S 49 | T 40 |
| ナ(NA) 51 | ニ(NI) 52 | ヌ(NU) 53 | ネ(NE) 54 | ノ(NO) 55 | U 56 | V 57 | W 58 | X 59 | Y 50 |
| ハ(HA) 61 | ヒ(HI) 62 | フ(HU) 63 | ヘ(HE) 64 | ホ(HO) 65 | Z 66 | ? 67 | ! 68 | ― 69 | / 60 |
| マ(MA) 71 | ミ(MI) 72 | ム(MU) 73 | メ(ME) 74 | モ(MO) 75 | ¥ 76 | & 77 | 🕒 78 | ☎ 79 | 🔋 70 |
| ヤ(YA) 81 | ( 82 | ユ(YU) 83 | ) 84 | ヨ(YO) 85 | * 86 | # 87 | SP 88 | ♥ 89 | SP 80 |
| ラ(RA) 91 | リ(RI) 92 | ル(RU) 93 | レ(RE) 94 | ロ(RO) 95 | 1 96 | 2 97 | 3 98 | 4 99 | 5 90 |
| ワ(WA) 01 | ヲ(WO) 02 | ン(N) 03 | " 04 | ° 05 | 6 06 | 7 07 | 8 08 | 9 09 | 0 00 |
| 😃 1*2 | 2*2 | CAR 🚗 3*2 | 👍 4*2 | ☀ 5*2 | 📱 6*2 | 💦 7*2 | ♥ 8*2 | 🍴 9*2 |  |
| 1*4 | 2*4 | 超 3*4 | 4*4 | ☂ 5*4 | 6*4 | ♪ 7*4 | チュ 8*4 | 🍺 9*4 |  |
| 1*6 | 2*6 | 🚃 3*6 | 4*6 | 🌷 5*6 | 📺 6*6 | 7*6 | 8*6 | 9*6 |  |

FIG.6
| NO. | TITLE | BACKGROUND PICTURE | NUMBER OF DISPLAYABLE ROWS | NUMBER OF DISPLAYABLE CHARACTERS PER ROW |
|---|---|---|---|---|
| 41 | FIR TREE | 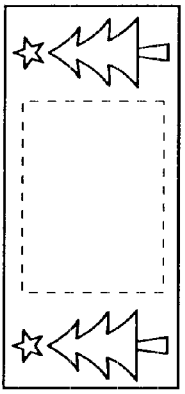 | 3 ROWS | 7 FULL-WIDTH CHARACTERS<br>14 HALF-WIDTH CHARACTERS |
| 42 | FROG | 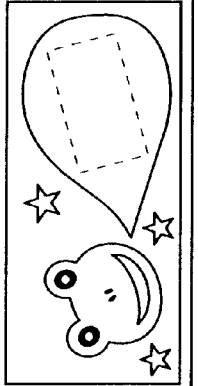 | 2 ROWS | 5 FULL-WIDTH CHARACTERS<br>10 HALF-WIDTH CHARACTERS |
| 43 | HEART | 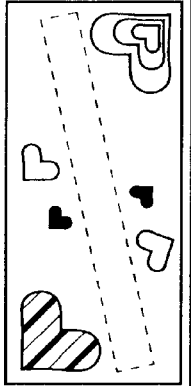 | 1 ROW | 13 FULL-WIDTH CHARACTERS<br>26 HALF-WIDTH CHARACTERS |

FIG.8

| NO. | FIXED SENTENCE |
|---|---|
| 11 | MERRY CHRISTMAS |
| 12 | CONGRATULATIONS |
| 13 | I LOVE YOU ! |
| 14 | TO |
| 15 | THANK YOU ! |
| 16 | GATHER ! |

FIG.11

| NO. | POSITION COMMAND |
|---|---|
| 21 | VERTICAL WRITING |
| 22 | CENTER |
| 23 | EVEN LAYOUT |
| 24 | LEFT JUSTIFY |
| 25 | RIGHT JUSTIFY |

FIG.12

| NO. | FONT COMMAND |
|---|---|
| 31 | ULTRA SMALL |
| 32 | SMALL |
| 33 | MEDIUM |
| 34 | LARGE |
| 35 | ULTRA LARGE |
| 36 | TIN |
| 37 | BOLD |
| 38 | ULTRA BOLD |
| 39 | GOTHIC |
| 40 | ROUND |

# COMMUNICATION APPARATUS CAPABLE OF CONTROLLING THE DISPLAY FORMAT OF A FIXED SENTENCE

BACKGROUND OF THE INVENTION

1. Field of the Invention

The present invention relates to a communication apparatus and, more particularly, to a communication apparatus capable of displaying a message together with a background picture.

2. Description of the Related Art

There has recently been proposed a radio pager allowing a calling person to send a fixed background picture and desired characters, so that character information to be displayed together with the background picture can be varied. A radio pager with this capability is disclosed in, e.g., Japanese laid-open patent application heisei 8-182049.

Specifically, a calling person intending to send a background picture stored in a radio pager of the type described inputs a free word to be displayed in the preselected area of the background picture. The background picture and free word sent are displayed on a radio pager of the same type belonging to a called person.

As stated above, the conventional radio pager can display a free word message consisting of desired characters together with a background picture. However, it is not practicable with such a radio pager to display a fixed sentence together with the background picture.

SUMMARY OF THE INVENTION

It is therefore an object of the present invention to improve the above conventional communication apparatus.

It is another object of the present invention to provide a communication apparatus capable of controlling, based on a designated background picture, the format of a fixed sentence to be displayed.

It is a further object of the present invention to provide a communication apparatus enhancing the free arrangement of a message to be displayed.

In order to achieve the above objects, a communication apparatus of the present invention includes a receiving section for receiving a signal including first information and second information, a first reading section for reading a background picture designated by the first information, a second reading section for reading a fixed sentence message designated by the second information, a controller for controlling, based on the background picture, the format of a display of the fixed sentence message, and a display for displaying the fixed sentence message together with the background picture in the format controlled by the controller. A communication apparatus of the present invention may include a storing section for storing a plurality of formats, at least one of formats is preferably selected according to background picture. It may include first storing section for storing said background picture and second storing section for storing said fixed sentence message. Preferably, the first information and second information include a background picture display command and a fixed sentence command, respectively. The controller should preferably cause, based on the background picture, the fixed sentence message to be displayed in a preselected area. It is preferable that the apparatus further includes a setting section for setting beforehand a preselected number of characters capable of being displayed in the preselected area, and a comparing section for comparing the number of characters constituting the fixed sentence message and the preselected number of characters. In this case, the display means displays, when the number of the fixed sentence message is greater than the preselected number of characters, the fixed sentence message in divided sections together with the background picture. The display should preferably display a single fixed sentence in a single frame. A storage may advantageously store a plurality of background pictures and allow them to be replaced periodically. Preferably, the apparatus further includes a decision means for determining whether or not the signal includes a particular command. When the decision means determines that the signal includes the particular command, the display displays the fixed sentence message in an arrangement designated by the particular command. The particular command may advantageously be at least one of a position command designating the position of the fixed sentence message to be displayed and a font command designating the size of the fixed sentence message to be displayed. The communication apparatus may be implemented as a radio selective calling receiver.

Also, a message displaying method for a communication apparatus of the present invention includes the steps of receiving a signal including first information and second information, reading a background picture designated by the first information, reading a fixed sentence message designated by the second information, controlling the format the fixed sentence message on the basis of the background picture, and displaying the fixed sentence message in the controlled format. The first information and second information should preferably include a background picture display command and a fixed sentence command, respectively. A message displaying method for a communication apparatus of the present invention may include a first storing section for storing said background picture and a second storing section for storing said fixed sentence message. Preferably, the method should further include the steps of setting beforehand a preselected number of characters of the fixed sentence message on the basis of the background picture, comparing the number of characters of the fixed sentence message and the preselected number of characters, and displaying, when the number of characters of the fixed sentence message is greater than the preselected number of characters, the fixed sentence message in divided sections together with the background picture. The method may advantageously include the steps of storing a plurality of background pictures, and displaying the plurality of background pictures while periodically replacing them. Desirably, the method should further include the step of determining whether or not the signal includes a particular command. When the signal includes the particular command, the fixed sentence message is displayed in an arrangement based on the particular command. The particular command may advantageously be at least one of a position command designating the position of a message to be displayed and a font command designating the size of the message to be displayed.

With the above configuration, the present invention is capable of varying the format of the fixed sentence on the basis of the background picture, thereby rendering the fixed sentence readable when displayed and promoting the effective use of the background picture. Moreover, the apparatus allows the calling person to cause a message to be displayed in a desired arrangement on an LCD by inputting a position command and/or a font command at the time of inputting data. The apparatus therefore enhances the free arrangement of a message on the LCD.

BRIEF DESCRIPTION OF THE DRAWINGS

These and other objects, features and advantages of the present invention will become more fully apparent from the following detailed description taken in conjunction with the accompanying drawings in which:

FIG. 2 shows a table storing specific fixed sentences;

FIG. 5 shows a preferable free word conversion table;

FIG. 6 shows a table storing preferable background pictures and stored in a ROM (Read Only Memory) included in the illustrative embodiment;

FIG. 8 shows a table storing the fixed sentences of FIG. 7 as well as other preferable fixed sentences;

FIG. 11 shows a table storing preferable positions, which may be designated, by a position command;

FIG. 12 shows a table storing preferable fonts, which may be designated by a font command;

DETAILED DESCRIPTION OF THE PREFERRED EMBODIMENT

Figure 1A:
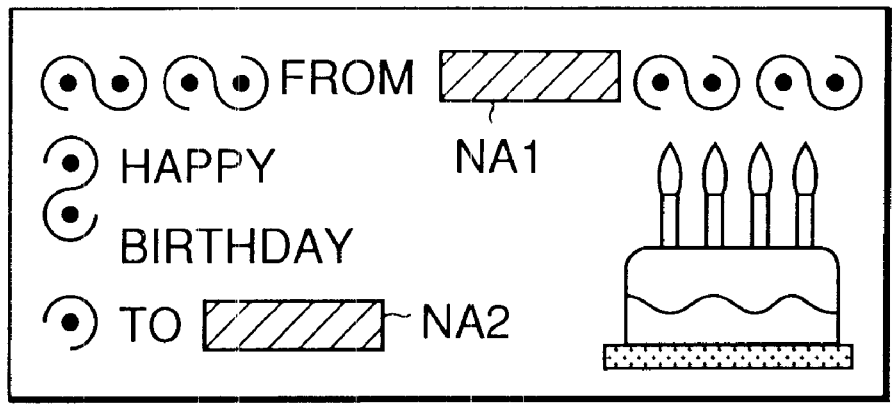
FIGS. 1a and 1b show a specific conventional background picture to be displayed.
Figure 1B:
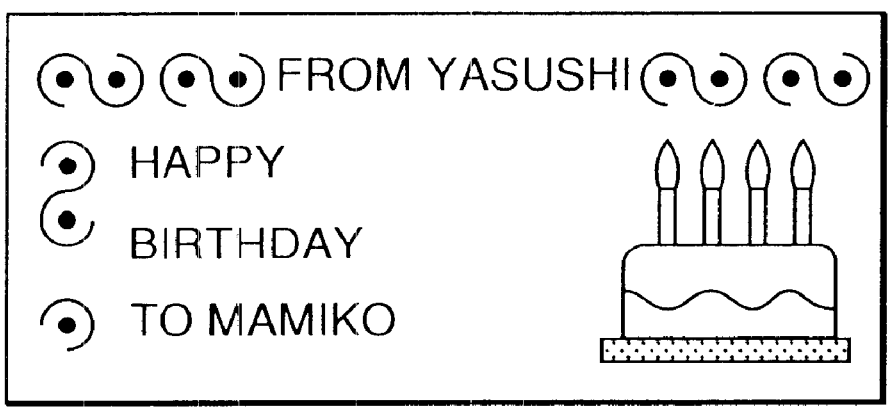

To better understand the present invention, a conventional radio pager will be described with reference to FIGS. 1a and 1b. The radio pager to be described is taught in laid-open patent application heisei 8-182049 mentioned earlier. FIG. 1a shows a specific background picture stored in the pager beforehand and including areas NA1 and NA2. The user of the pager intending to send the background picture of FIG. 1a inputs the user's name "YASUSHI" in the area NA1 and the name of a person to be called "MAMIKO" in the area NA2. The background picture and names sent are displayed on the called person's pager, as shown in FIG. 1b.

The above conventional radio pager is capable of displaying a free word message, i.e., desired characters selected by the calling person together with a background picture. The radio pager, however, cannot display a fixed sentence together with a background picture.

Figure 2:
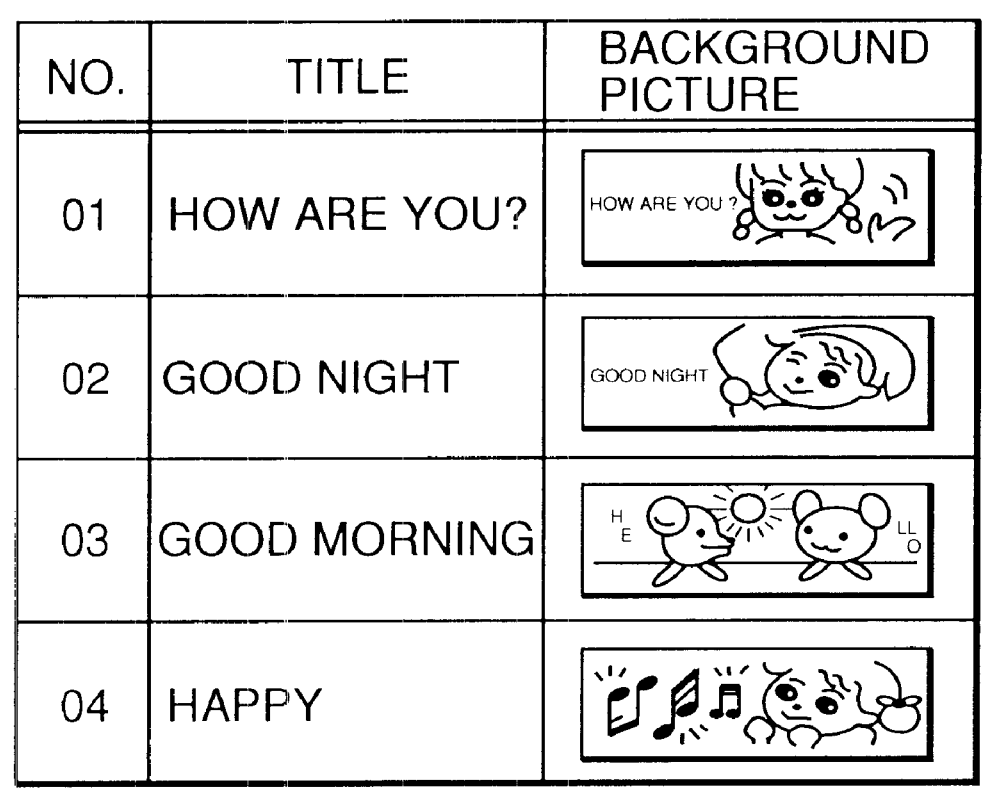
Figure 3A:
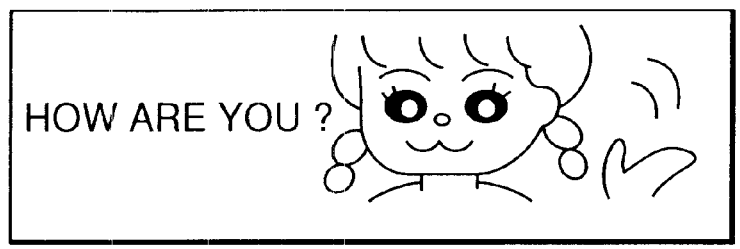
FIGS. 3a and 3b each shows a specific fixed sentence to be displayed.
Figure 3B:
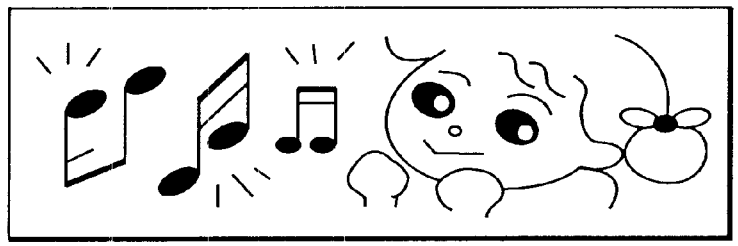

On the other hand, assume that the radio pager stores a background picture table shown in FIG. 2 beforehand. Then, the calling person may select any desired background picture stored in the table and send it by inputting a two-figure number assigned to the picture. The background picture selected will be displayed on the called person's radio pager. Specifically, a background picture including preselected characters shown in FIG. 3a or only a background picture shown in FIG. 3b will appear on the called person's radio pager.

Even the above background picture table scheme has the following problems left unsolved. As shown in FIG. 2, each of the fixed background pictures is stored in the table together with particular fixed character information. Therefore, the calling person cannot send a desired background picture while changing the character information associated therewith. Further, when the calling person selects a background picture not including character information, the person cannot send character information at all.

Briefly, the present invention rearranges, based on a background picture selected by a calling person, a fixed sentence also input by the calling person so as to render the fixed sentence readable and to promote the effective use of the picture. Further, the present invention allows the calling person to input a position command and/or a font command at the time of transmission of data, thereby changing a format in which a message appears on an LCD and enhancing the free display of a message.

Figure 4:
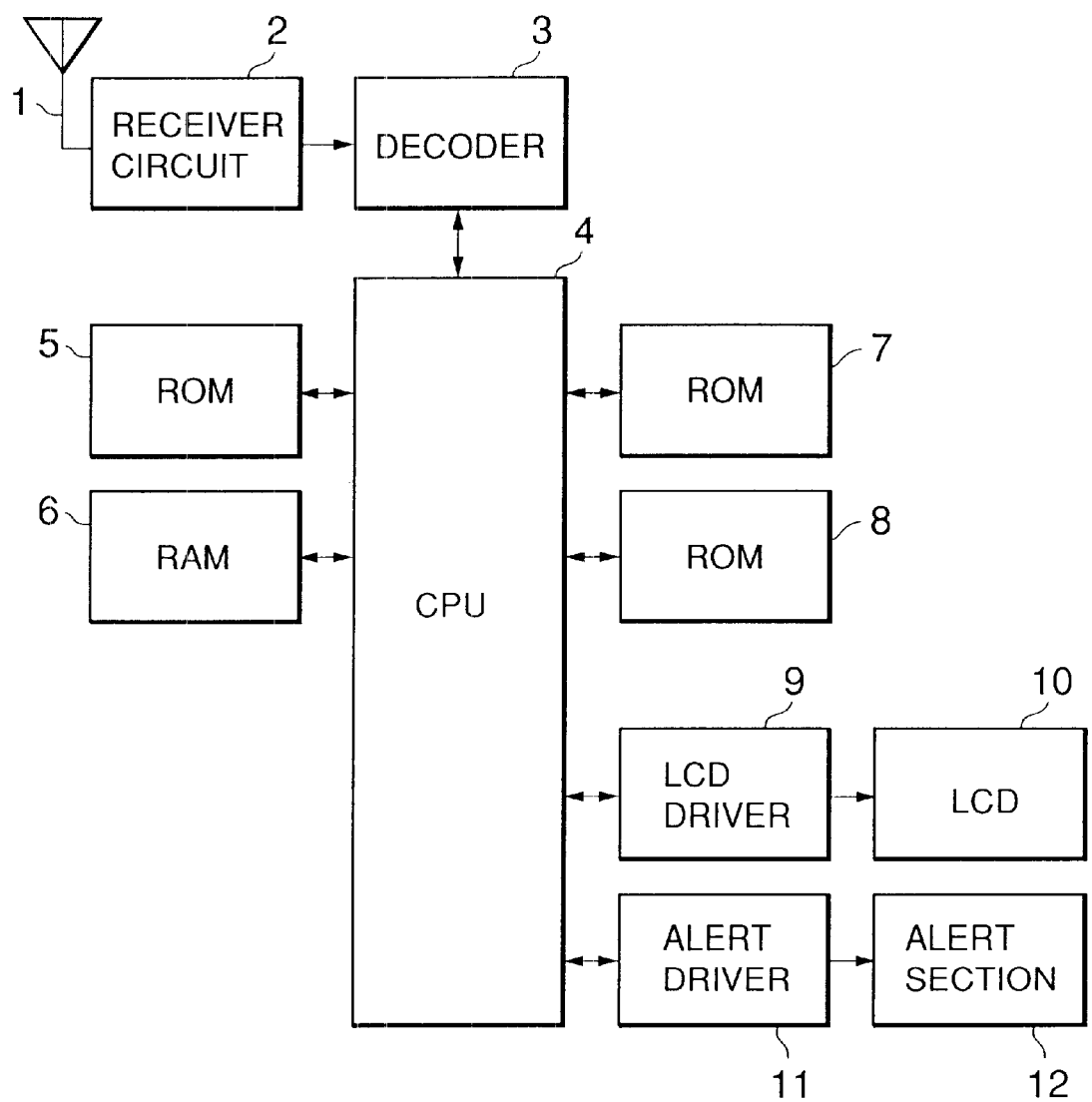
FIG. 4 is a preferable block diagram showing a communication apparatus embodying the present invention and implemented as a radio selective calling receiver by way of example.

Reference will be made to FIGS. 4–14c for describing a communication apparatus embodying the present invention and implemented as a radio selective calling receiver by way of example. As shown in FIG. 4, the radio pager includes an antenna 1 and a receiver circuit 2 connected to the antenna 1. When a radio signal or paging signal sent from a base station, not shown, comes in through the antenna 1, the receiver circuit 2 amplifies and demodulates the signal and thereby outputs a wave-shaped digital signal. A decoder 3 compares an address number assigned to the pager beforehand and an address signal included in the received signal. A ROM 5 stores the above address number assigned to the pager. A RAM (Random Access Memory) 6 temporarily stores message data also included in the received signal. A ROM 7 stores at least one background picture while a ROM 8 stores at least one fixed sentence. An LCD driver 9 controls an LCD 10 capable of displaying a received message and a background picture. An alert driver 11 controls an alert section 12 that alerts the user of the receiver to the receipt of a call. The alert section 12 should preferably be implemented by at least one of a speaker, an LED (Light Emitting Diode), and a vibrator. A CPU (Central Processing Unit) 4 controls such various sections constituting the pager.

The operation of the radio selective calling receiver shown in FIG. 4 will be briefly described hereinafter. A radio signal based on, e.g., a POCSAG system comes in through the antenna 1. The receiver circuit 2 amplifies and demodulates the radio signal to thereby output a wave-shaped digital signal. The digital signal is input to the decoder 3. In response, the decoder 3 compares an address number included in the digital signal and the address number stored in the ROM 5. If the two address signals compare equal, the decoder 3 delivers message data following the received address number to the CPU 4. The CPU 4 stores the message data in the RAM 6 and, at the same time, feeds a control signal to the alert driver 11 on the basis of alerting means selected by the called person beforehand. In response, the alert driver 11 causes the alert section 12 to alert the called person to the receipt of a call. Further, the CPU 4 determines whether or not the message codeword is headed by a background picture display command, e.g., "*08". If the message codeword is headed by the background picture display command, the CPU 4 reads a background picture designated by symbols following the command out of the ROM 7. If the message codeword includes a fixed sentence command, e.g., "*05", then the CPU 4 reads a fixed sentence designated by the command out of the ROM 8. If the message codeword includes a free word command, e.g., "*2*2", then the CPU 4 transforms symbols following the free word command to desired characters by referencing a free word conversion table shown in FIG. 5. In FIG. 5, a character transformed by the free word command "*3*4" is a Chinese character that means "over", and a character transformed by the free word command "*8*4" is a kana character that means "kiss". The background picture and the fixed sentence or the transformed characters are displayed on the LCD 10 via the LCD driver 9.

FIG. 6 shows a table stored in the ROM 7 and listing preferable background pictures. As shown, the ROM 7 stores three different background pictures beforehand. In each of the background pictures, desired characters or a desired fixed sentence can be displayed in the area delimited by a dotted line. Specifically, when the calling person selects a desired background picture and inputs desired characters or a desired fixed sentence to appear in the background picture, the background picture and the characters or fixed sentence a re displayed together. The number of displayable character rows and the number of displayable characters for a row are preselected picture by picture, as listed in the above table.

Usually, characters are sequentially displayed in the horizontal direction from the first column of the first row. However, when the number of characters constituting a received message is greater than the number of characters that can be displayed, only the characters are switched to the next page with the same background picture being displayed. This may be done either automatically on the elapse of a preselected period of time or manually by the user via a switch not shown. With the manual switching scheme, however, the user cannot see in which picture the received message ends; some implementation for recognition, e.g., an indication that the message is to be continued should be provided. The CPU 4 compares the number of characters of the received message and the number of characters that can be displayed together with the desired background picture in order to determine whether or not the former exceeds the latter.

Figure 7:
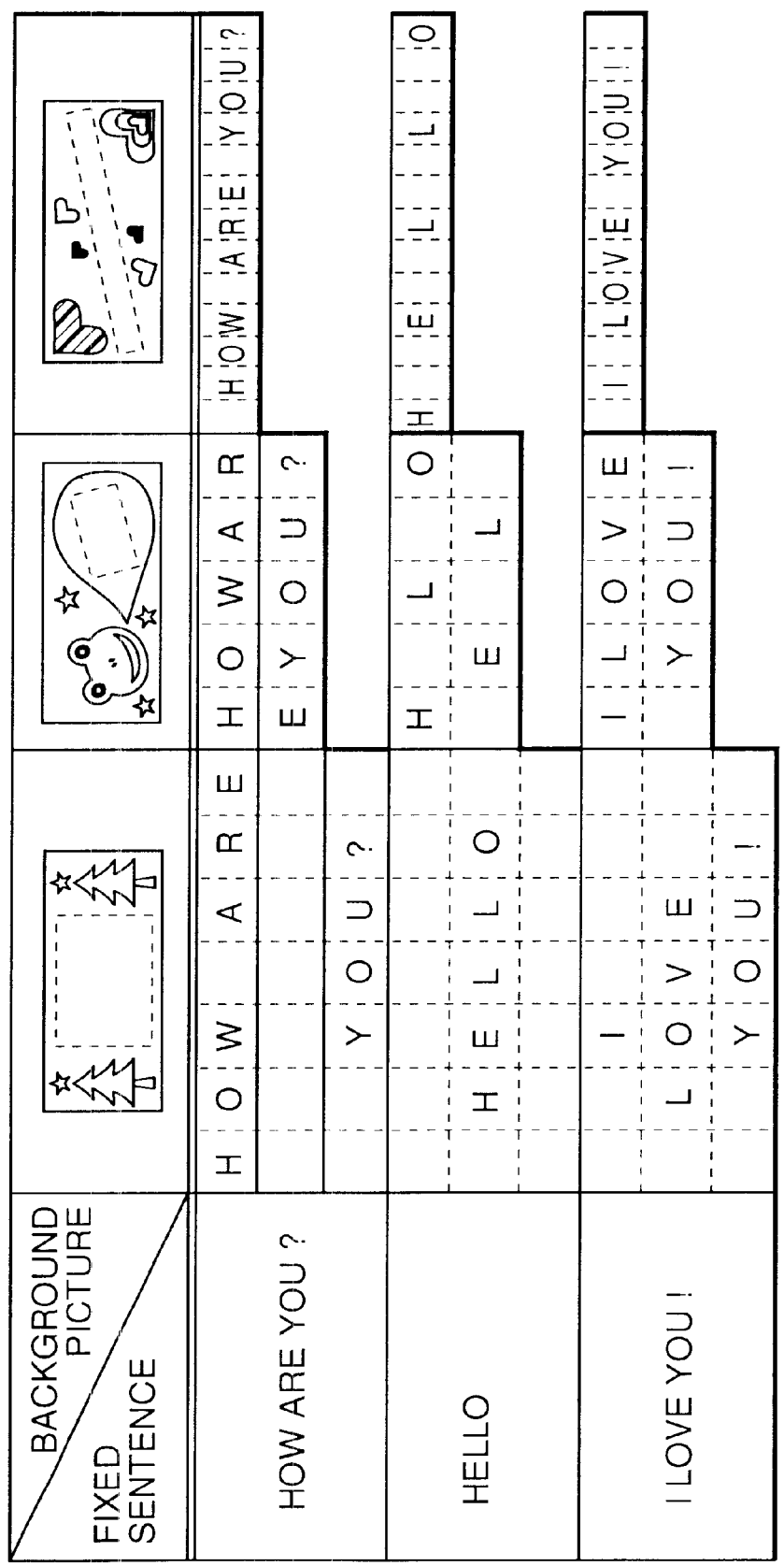
FIG. 7 shows preferable arrangements of fixed sentences in the pictures of FIG. 6.

A fixed sentence may be displayed in the area of any one of the background pictures of FIG. 6 indicated by the dotted line, as follows. FIG. 7 shows preferable arrangements, or formats, of exemplary fixed sentences in combination with the background pictures. As shown, a fixed sentence "ごきげんいかが?(meaning "How are you?" in English)" is displayed on the first and third rows in a background picture showing fir trees. A fixed sentence "こんにちは(meaning "Hello" in English)" is displayed on the second row of the above picture while a fixed message "I LOVE YOU!" is displayed on the first to third rows of the same picture. It is desirable that the user can freely change the arrangement of such a fixed sentence in a background picture.

FIG. 8 shows a table stored in the ROM 8, FIG. 8, and listing preferable fixed sentences. As shown, the table lists six fixed sentences by way of example. To send, e.g., the fixed sentence "メリークリスマス", the user should only input a fixed sentence command, e.g., "*05" and then a fixed sentence number "11" assigned to the above fixed sentence.

Figure 9:
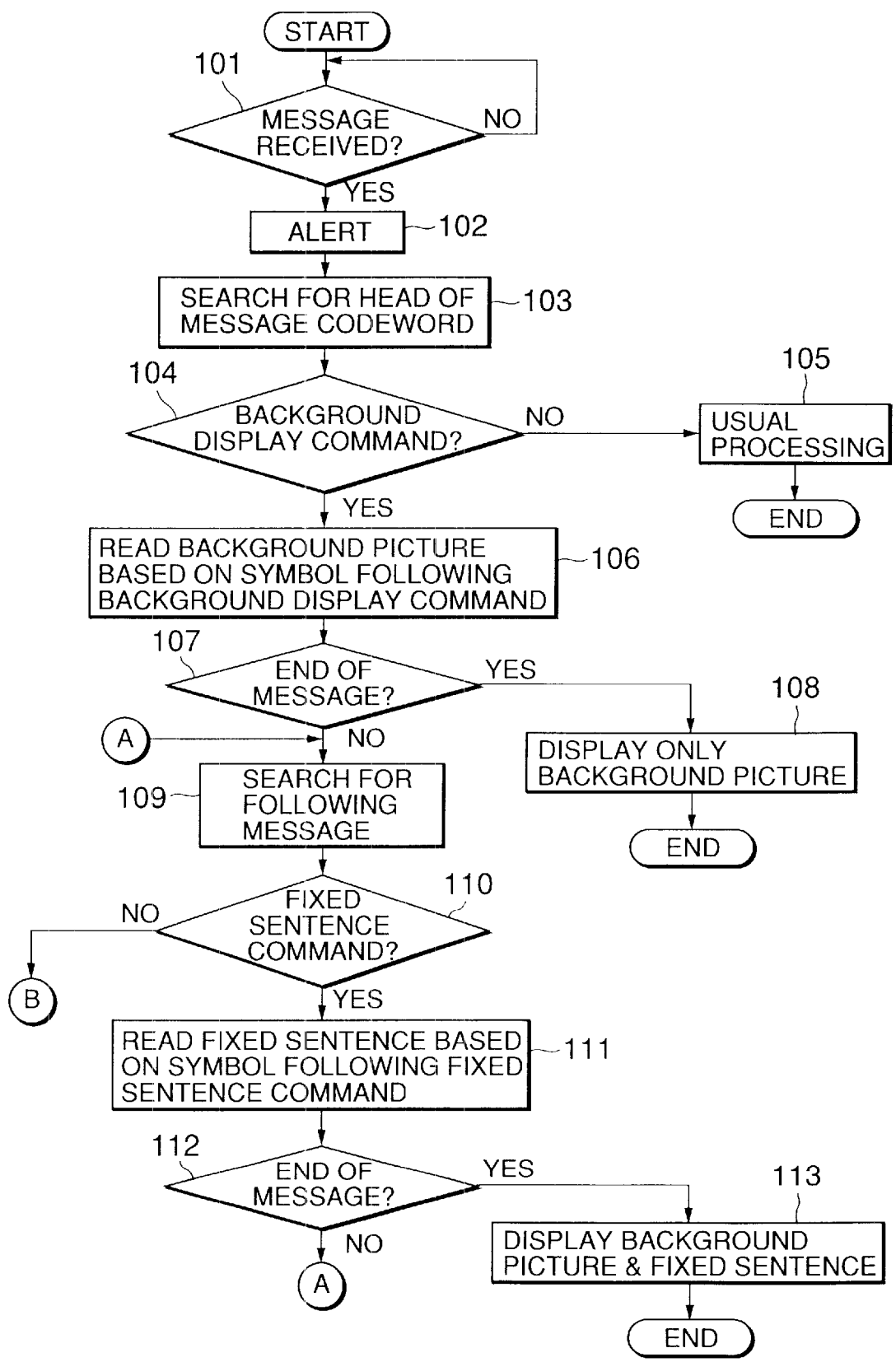
FIGS. 9 and 10 are flowcharts demonstrating a preferable operation of the illustrative embodiment.
Figure 10:
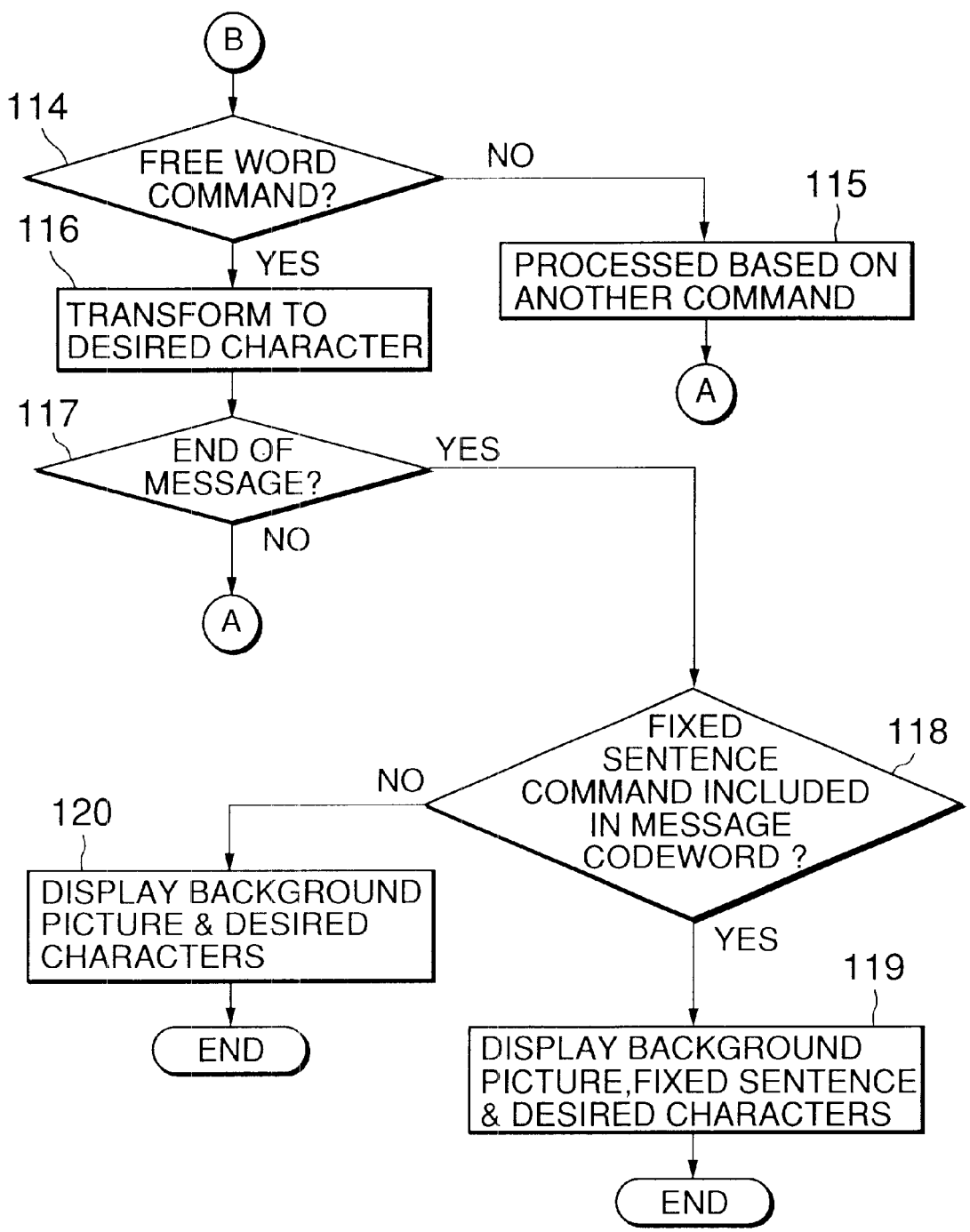

A more preferable operation of the illustrative embodiment, i.e., the CPU 4 will be described with reference to FIGS. 9 and 10. When a message sent from a base station, not shown, comes in through the antenna 1 (YES, step 101), the CPU 4 causes the alert section 12 to alert the user of the receiver to the receipt of a call (step 102). The CPU 4 searches for the head of a received message codeword (step 103) and then determines whether or not the codeword begins with a background picture display command (step 104). If the answer of the step 104 is positive (YES), then the CPU 4 reads a background picture designated by a symbol following the above command out of the ROM 7 (step 106). If the answer of the step 104 is negative (NO), then the CPU 4 executes usual processing, i.e., reads a fixed sentence designated by a fixed sentence command and displays the fixed sentence (step 105). Alternatively, the CPU 4 may transform received symbols to desired characters by referencing a free word conversion table and display the transformed characters (step 105).

After the CPU 4 has read the background picture out of the ROM 7 in the step 106, it determines whether or not the message has ended (step 107). If the answer of the step 107 is YES, then the CPU 4 displays only the background picture (step 108). If the answer of the step S107 is NO, then the CPU 4 searches for a message following the symbol (step 109) and determines whether or not the next symbol is a fixed sentence command (step 110). If the answer of the step 110 is YES, then the CPU 4 reads a fixed sentence designated by a symbol following the fixed sentence command out of the ROM 8 (step 111). Then, the CPU 4 again determines whether or not the message has ended (step 112). If the answer of the step S112 is YES, then the CPU 4 displays the background picture and fixed sentence together in a preselected format (step 113). If the answer of the step 112 is NO, then the CPU 4 returns to the step 109 for searching for the next symbol.

If the next symbol is not a fixed sentence command (NO, step 110), then the CPU 4 determines whether or not a symbol following the background picture display command is a free word command (step 114). If the answer of the step 114 is YES, then the CPU 4 transforms the symbol to a desired character by referencing the free word conversion table shown in FIG. 5. Then, the CPU 4 determines whether or not the message has ended (step 117). If the answer of the step 117 is YES, then the CPU 4 determines whether or not the message codeword includes a fixed sentence command (step 118). If the answer of the step 118 is YES, then the CPU 4 causes the background picture and fixed sentence read out and the desired characters to be displayed together (step 119). How each fixed sentence should be arranged in the associated background picture, i.e., the format of each fixed sentence is fixed, as shown in FIG. 7. Therefore, in the step 119, only the desired characters are displayed on the page next to the page of the fixed sentence while the same background picture is continuously displayed on both of such pages.

If the message codeword does not include a fixed sentence command (NO, step 118), then the CPU 4 causes the background picture and desired characters to be displayed together (step 120). If the answer of the step 117 is NO, meaning that the message has not ended, then the CPU 4 returns to the step 109 for searching for the next symbol.

If the symbol following the background picture display command is neither a fixed sentence command nor a free word command (NO, step 114), then the CPU 4 executes processing based on another command (step 115) and returns to the step 109.

Another command mentioned above in relation to the step 115 may be a position command or a font command by way of example and should preferably be stored in another ROM or similar storage not shown. FIG. 11 lists preferable positions to be selectively designated by the position command. Likewise, FIG. 12 lists preferable fonts to be selectively designated by the font command. The position command and font command may be "*07" and "*09", respectively. The position command or the font command follows the background picture display command and background picture number and is followed by the number shown in FIG.

11 or 12. Therefore, when the background picture display command is followed by the position command or the font command in the message codeword, the fixed sentence or the desired characters following the command are displayed at the designated position or in the designated font together with the background picture (step 115, FIG. 10).

Figure 13A:
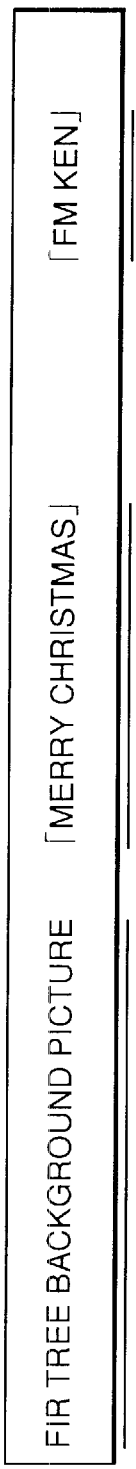
FIGS. 13a–13d show preferable data to be input by a calling person.
Figure 13B:
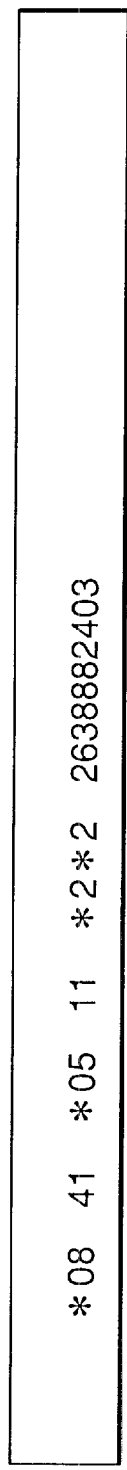
Figure 13C:
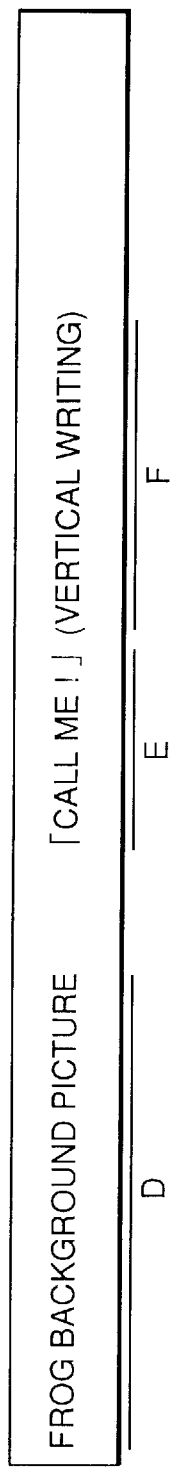
Figure 13D:
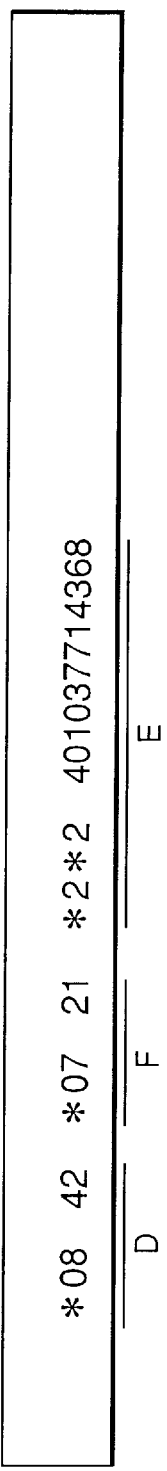
Figure 14A:
FIGS. 14a–14c show preferable images to appear on an LCD (Liquid Crystal Display) included in the illustrative embodiment in accordance with the data shown in FIGS. 13a–13d.
Figure 14B:

Reference will be made to FIGS. 13a–13d and 14a–14c for describing preferable data to be input by the calling person and preferable images to appear on the LCD 10, FIG. 4, in accordance with the input data. As shown in FIG. 13a, assume that the calling person desires to send the fir tree background picture and fixed sentence "MERRY CHRISTMAS" shown in FIG. 7 and a free word "FM KEN" in this order. Then, the calling person inputs data shown in FIG. 13b. FIGS. 14a and 14b show a background picture and a message appearing on the LCD 10 of the pager of the called person in accordance with the above data input by the calling person. The message is displayed on a plurality of pages because a fixed sentence is always displayed on a single page, as stated earlier.

Figure 14C:
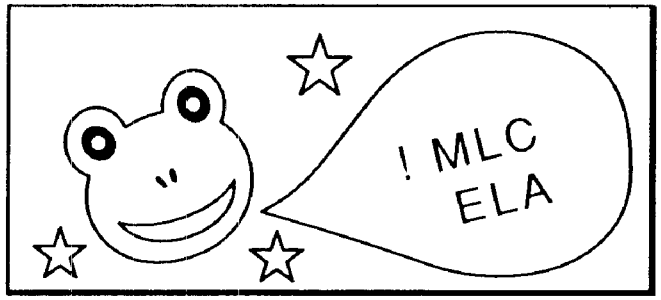

As shown in FIG. 13c, assume that the calling person desires to send a frog background picture shown in FIG. 7 and a free word "CALL ME!" in this order and wants the free word to be displayed in vertical writing at the called person's station. Then, the calling person inputs data shown in FIG. 13d. To cause the free word to be displayed in vertical writing, the calling person inputs the position command "*07" and a number "21" assigned to vertical writing after a number "42" designating the frog background picture. FIG. 14c shows a background picture and a message appearing on the LCD 10 of the pager of the called person in accordance with the data shown in FIG. 13d; the message is displayed in vertical writing. When a person writes a hieroglyphic, it is written not only sideways but also vertically. Therefore, it is effective to display the message in vertical writing.

If desired, one or more of the stored background pictures may be implemented as an animation varying at preselected intervals. In this case, consecutive background pictures constituting an animation should be stored in the ROM 7 in combination. That is, at least one of background pictures constituting an animation and still background pictures are stored in the ROM 7. This allows the calling person to select either one of them by inputting a preselected symbol after the background picture display command.

In the illustrative embodiment, a single fixed sentence is arranged in a single picture in a preselected format. Alternatively, a plurality of fixed sentences and a plurality of free words may be displayed in a single picture. In this alternative case, the fixed sentences should preferably be grouped by, e.g., a pattern to be used, so that the sentences of each group may not overlap each other on the LCD. Further, when any one of the fixed sentences belonging to a certain group overlaps with any one of the fixed sentences belonging to another group, it should preferably be displayed on a plurality of frames.

The background picture and message are displayed when called later in exactly the same manner as when they are received.

Another background picture may be displayed in the area of the background picture assigned to a message in place of a fixed message or desired characters, if desired.

While the above description has concentrated on a radio selective calling receiver, the present invention is similarly applicable to any other communication apparatus, e.g., a mobile data terminal or a handy phone so long as the apparatus includes an LCD or similar display.

In summary, in accordance with the present invention, a communication apparatus is capable of displaying, based on data input by a calling person, desired characters and a fixed sentence together with a fixed background picture. Because the format of the fixed sentence to be displayed is variable on the basis of the background picture, the fixed sentence is readable when displayed. This promotes the effective use of the background picture. Moreover, the apparatus allows the calling person to cause a message to be displayed in a desired arrangement on an LCD by inputting a position command and/or a font command at the time of inputting data. The apparatus therefore enhances the free arrangement of a message on the LCD.

Obviously, numerous additional modifications and variations of the present invention are possible in light of the above teachings. It is therefore to be understood that within the scope of the appended claims, the invention may be practiced otherwise than as specifically described herein.

What is claimed is:

1. A communication apparatus comprising:

receiving means for receiving a signal including first information and second information;

reading means for reading a background picture designated by said first information and for reading a fixed sentence message designated by said second information;

control means for controlling, based on the background picture, a format of a display of the fixed sentence message;

display means for displaying the fixed sentence message together with the background picture in the format controlled by said control means, setting means for setting beforehand a preselected number of characters capable of being displayed in a preselected area; and comparing means for comparing a number of characters comprising the fixed sentence message and the preselected number of characters;

wherein said format comprises a preselected format for a selected background picture, wherein said control means causes, based on the background picture, the fixed sentence message to be displayed in a preselected area, and wherein when the number of the fixed sentence message is greater than the preselected number of characters, said fixed sentence message is displayed in a next page together with a background picture.

2. A communication apparatus comprising:

receiving means for receiving a signal including first information and second information;

reading means for reading a background picture designated by said first information and for reading a fixed sentence message designated by said second information;

control means for controlling, based on the background picture, a format of a display of the fixed sentence message;

display means for displaying the fixed sentence message together with the background picture in the format controlled by said control means; and decision means for determining whether the signal received from an antenna includes a particular command, said display means displaying, when said decision means determines that said signal includes said particular command, the fixed sentence message in an arrangement designated by said particular command, wherein said particular command comprises at least one of a position command designating a position of the fixed sentence message to be displayed and a font command designating a size of said fixed sentence message to be displayed.

3. A message displaying method for a communication apparatus, comprising:

receiving a signal including first information and second information;

reading a background picture designated by said first information;

reading a fixed sentence message designated by said second information;

controlling a format of the fixed sentence message on the basis of the background picture;

displaying the fixed sentence message in the format controlled;

setting beforehand a preselected number of characters of the fixed sentence message on the basis of the background picture;

comparing a number of characters of the fixed sentence message and the preselected number of characters; and displaying, when the number of characters of the fixed sentence message is greater than the preselected number of characters, said fixed sentence message in a next page together with the background picture, wherein said format comprises a preselected format for a selected background picture.

* * * * *